Figure 2:
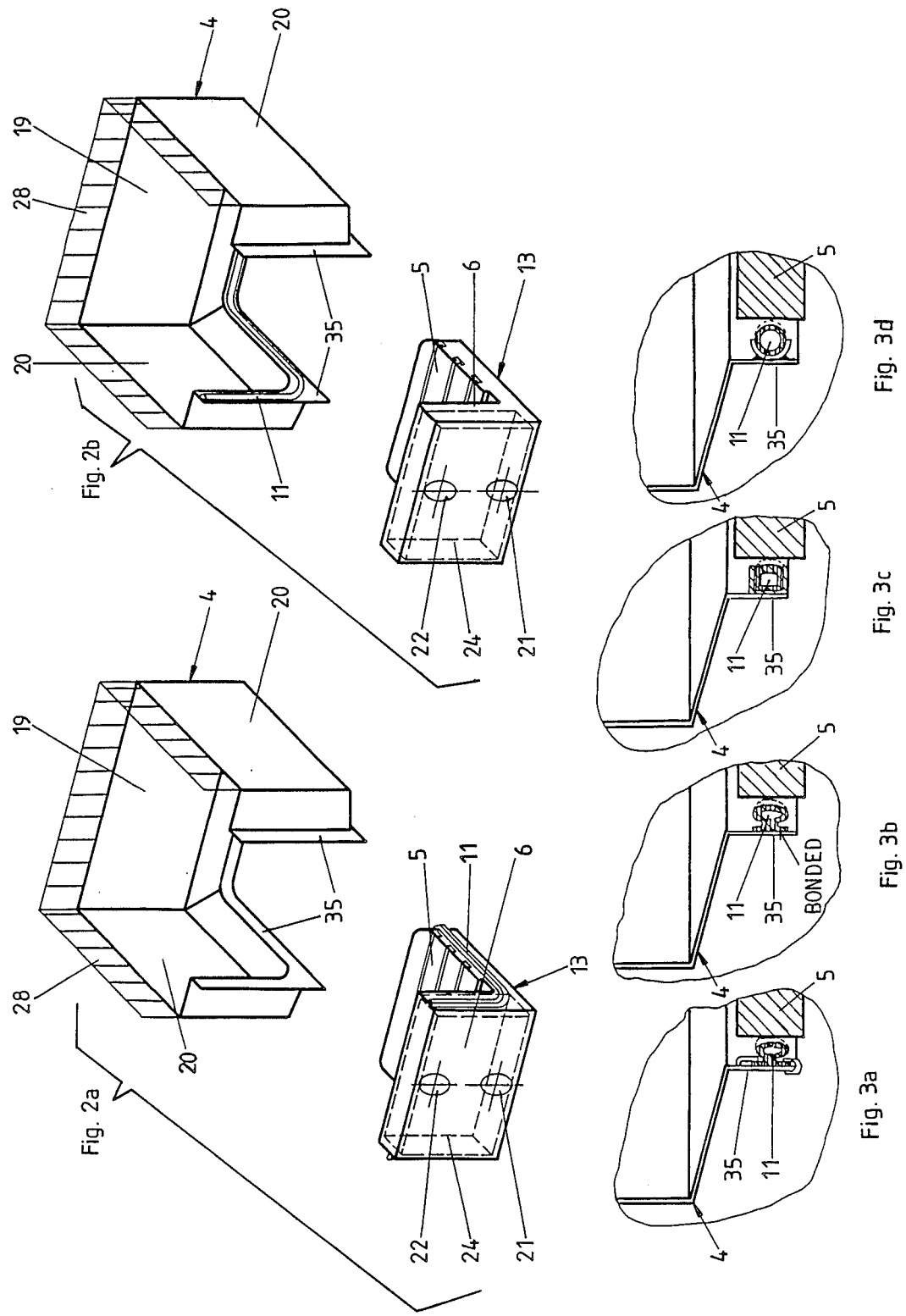

United States Patent [19]
Lodetti et al.

[11] Patent Number: 4,712,288
[45] Date of Patent: Dec. 15, 1987

[54] SPARK ERODER WITH FIXED MACHINE TABLE AND LOWERABLE WORKING CONTAINER FOR THE DIELECTRIC

[75] Inventors: Attilio Lodetti; Hansueli Blaser, both of Losone, Switzerland

[73] Assignee: AG fur industrielle Elektronik AGIE Losone b. Locarno, Losone, Switzerland

[21] Appl. No.: 805,152

[22] Filed: Dec. 4, 1985

[30] Foreign Application Priority Data

Dec. 5, 1984 [DE] Fed. Rep. of Germany ....... 3444390

[51] Int. Cl.$^4$ .............................................. B23P 13/00
[52] U.S. Cl. ..................................... 29/557; 219/69 R
[58] Field of Search ............ 29/557; 204/129.1, 129.5, 204/3; 219/69 D, 69 R, 69 G

[56] References Cited

U.S. PATENT DOCUMENTS

| | | | |
|---|---|---|---|
| 3,541,291 | 11/1970 | Johanson | 219/69 G |
| 3,542,993 | 11/1970 | Buck | 204/129.5 |
| 3,825,245 | 7/1974 | Osburn et al. | 198/465.1 |
| 4,423,806 | 1/1984 | Ogasawara | 198/465.1 |
| 4,534,546 | 8/1985 | Cattani | 269/309 |

FOREIGN PATENT DOCUMENTS

| | | |
|---|---|---|
| 1565371 | 7/1971 | Fed. Rep. of Germany . |
| 2320370 | 4/1973 | Fed. Rep. of Germany . |
| 2257138 | 3/1974 | Fed. Rep. of Germany . |
| 2514899 | 10/1976 | Fed. Rep. of Germany . |
| 2811299 | 9/1979 | Fed. Rep. of Germany . |
| 3213013 | 10/1983 | Fed. Rep. of Germany . |
| 0123792 | 2/1984 | Fed. Rep. of Germany . |
| 3303758 | 8/1984 | Fed. Rep. of Germany . |
| 0093231 | 5/1984 | Japan | 219/69 D |
| 0169726 | 9/1984 | Japan | 219/69 D |
| 0232723 | 12/1984 | Japan | 219/69 D |

OTHER PUBLICATIONS

German Industrial Standard DIN 55201 (see figures) Jun. 1983.
"VID-Zeitschrift" 123/19 (I) (Oct. 1981) pp. 815-818.
"VID-Zeitschrift" 119/6 (II) (Mar. 1977) pp. 4-7.
"Fertigung" 5/77 pp. 117-124.
"Werkstatt und Betrieb" 115/6 (1982) p. 411.
"Machine & Werkzeug" 19/1984 p. 6.
"American Machinist", Mar. 1984, pp. 113 and 124.
Technical press release at 1983 exhibition in Dusseldorf.
Technical information at 1984 exhibition in Paris.

Primary Examiner—Howard N. Goldberg
Assistant Examiner—Irene Graves Golabi
Attorney, Agent, or Firm—Neuman, Williams, Anderson & Olson

[57] ABSTRACT

A spark erosion machine having the machine table fixed to the machine upright and including a working container for the dielectric fluid that is formed of a fixed component and a movable component. The fixed component includes the machine table plate, which is fastened to the machine table and forms a portion of the bottom of the working container, plus a wall element that forms a portion of a wall of the working container. The movable component forms the remainder of the work container. The movable component can be lowered to permit access to the table plate and, when raised, joins with the fixed component to form a sealed container.

17 Claims, 10 Drawing Figures

Fig. 1
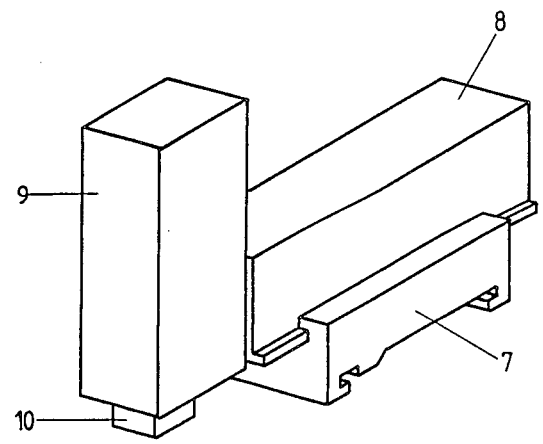
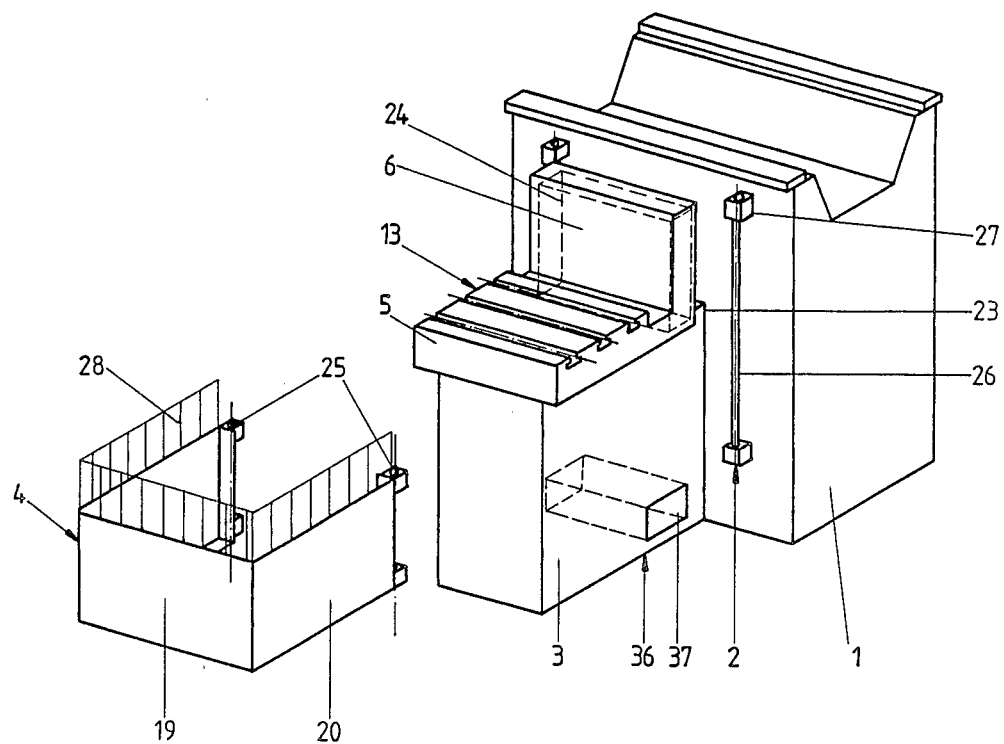

Fig. 3
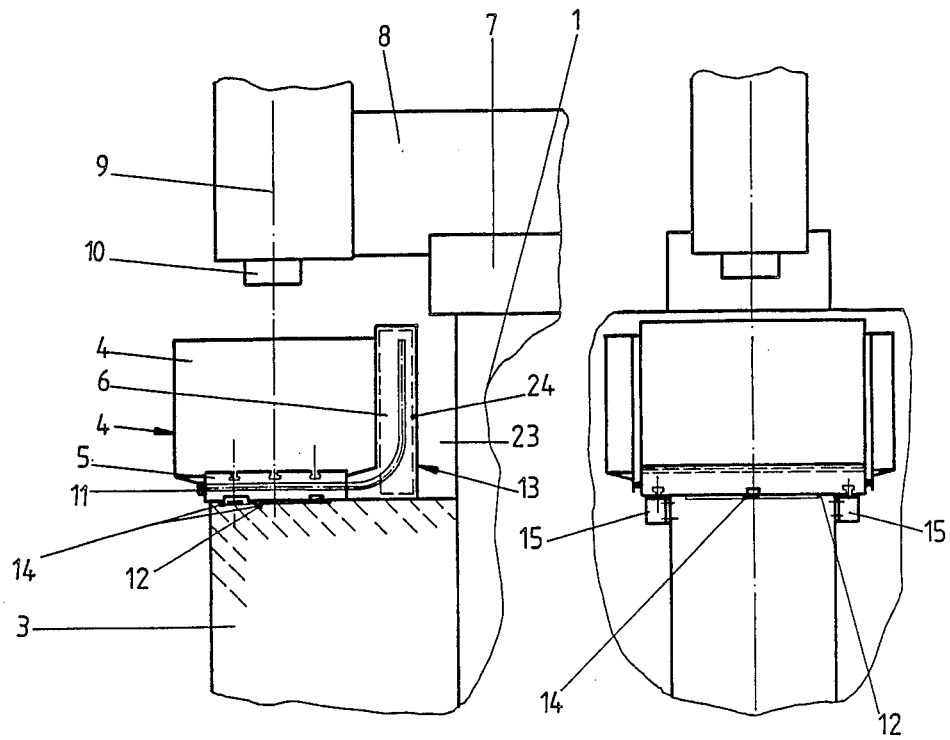
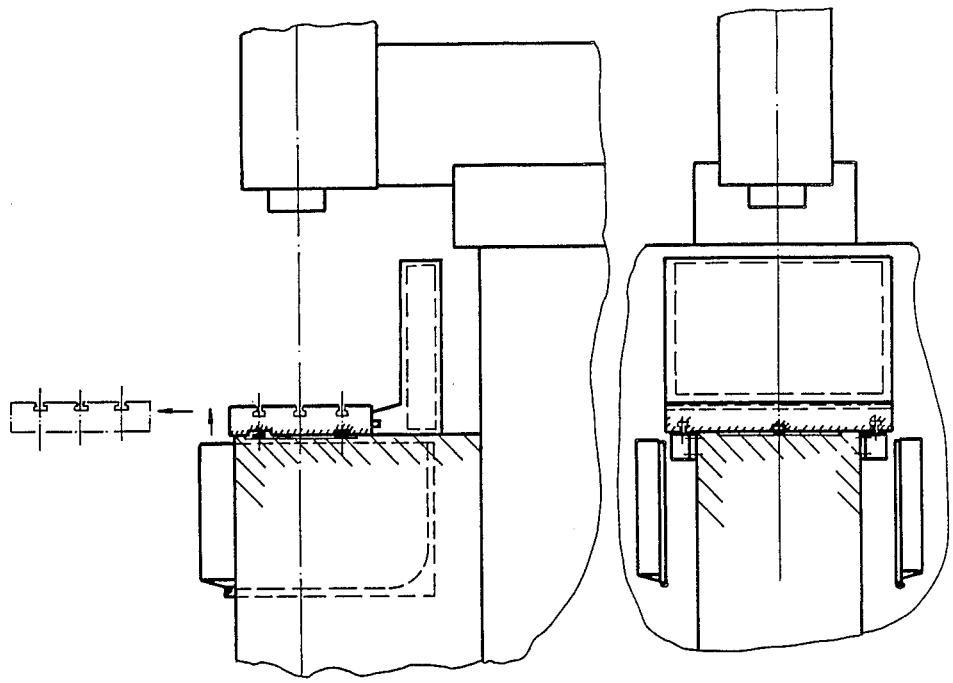

SPARK ERODER WITH FIXED MACHINE TABLE AND LOWERABLE WORKING CONTAINER FOR THE DIELECTRIC

The present invention relates to a spark erosion machine, or spark eroder, having a fixed machine table and a working container for the dielectric fluid associated with the machine table and formed of a fixed component and at least one movable component. The fixed component contains the machine table plate, which in the operative position forms at least a portion of the bottom of the working container.

The aforementioned general machine structure is known from conventional spark eroders. The fixed machine table in such machines, inter alia, promotes high stability and therefore high working accuracy, despite the considerable forces between the tool electrode and the workpiece. In the conventional spark eroder, the machine table carrying the machine table plate is constructed as a self supporting column on the base of the machine and is independent of the machine upright. The fixed component of the working container includes the machine table plate. The movable component of the working container includes a closed, offset sheet metal frame, which surrounds the column in sleeve-like manner and incorporates a seal. The movable component is vertically movable along the column and in its raised position forms the sidewalls of the working container for receiving a dielectric fluid. This conventional machine has the disadvantages of a long force line path, a relatively small connecting surface between the machine upright and machine table and the necessary use of dynamic seals between the movable component of the working container and the machine table guiding the same. Because the machine table plate normally overhangs the machine table, on changing the dynamic seal it is first necessary to dismantle the table plate, requiring a repeat adjustment and setting of the machine table plate in order to be able to work accurately. The result of these disadvantages is that the working accuracy of the machine is impaired.

German Pat. No. 25 14 899 (Bock) describes a spark eroder with a lowerable working container for the dielectric fluid. The working container includes a vertically movable container portion having the shape of the complete container but without a rear wall, plus a rear guide plate. The adjacent surfaces of the open part of the container and the rear guide plate are equipped with dynamically functioning seals. The bottom of the working container engages below a machine table fixed to the rear guide plate and projecting into the working container. As in the case of the above described conventional spark eroder, the movable portion of the working container can be lowered to below the upper edge of the machine table plate, allowing complete accessibility to the workpiece and tools. However, this spark eroder also fails to provide adequate stability for high precision operations. The machine table plate or machine table is fixed by means of a rear spindle sleeve to the rear guide plate. The rear guide plate is in turn connected by horizontal and vertical slides to the machine upright, so that there is no fixed machine table.

In addition, spark eroders with a movable machine table and a working container having movable parts mounted thereon are known from German Pat. No. 15 65 371 (AEG), DE-OS No. 22 57 138 (Societe Genevoise d'Instruments de physique) and U.S. Pat. No. 3,542,993 (Buck).

German published patent application No. 33 03 758 and European published patent application No. 0 123 792 both describe a spark eroder with a lowerable working container for the dielectric fluid. The working container includes a vertically movable container portion comprising the vertical front wall and two vertical sidewalls of the working container, and a fixed container portion comprising the fixed machine table acting as a bottom of the working container and the front side of the machine upright acting as a vertical rear wall of the workig container. This construction provides a high stability and stiffness and also free access to the machine table plate when the movable container portion is lowered.

The problem addressed by the present invention is to improve the conventional spark eroder of the mentioned type, while largely retaining its advantages, the particular aim being to increase its working accuracy. In the present invention, this problem is solved by providing a spark eroder, in which the fixed component additionally includes a wall element, which essentially forms the wall (rear wall) of the working container facing the machine upright.

The construction of a fixed rear wall directly facing the machine stand does not impair complete accessibility to workpiece and tool. Further, there is no need to provide a gap between the machine table and the machine upright for the vertical positioning of a wall of the working container, as is required in a conventional spark eroder. Thus, in the present invention, the machine table can be directly connected to the machine upright. This allows the possibility of a large area of connection between the machine table and the machine upright. If the upper part of the machine table is also joined to the machine upright, a shorter, closed force closure path is possible. This leads to a high stability of the spark eroder, which is an essential requirement for high working accuracy. The present invention further provides the possibility of thermally separating, by means of appropriate thermal isolation, the machine upright from the fixed vertical wall element of the working container which constitutes the rear wall thereof and is attached to the machine table plate. Such thermal separation greatly reduces thermal stress and the corresponding dificiency in working precision.

Preferably, the fixed component is constructed in one piece. In the case of a substantially parallelepipedic working container, the fixed component essentially has the shape of two rectangularly adjacent surfaces.

A preferred embodiment of the present invention has the advantage of minimizing sealing problems to a few surfaces when the components are joined to form the working container. There is the additional advantage of a comparatively stable working container. The stability of the working container can be further increased where further surface elements are connected to the wall elements of the working container to act as parts of the working container bottom and the working container rear wall and, in the assembled or joined state of said container, are adjacent to the fixed component. In a further development of the present technical concept, the movable component of the working container is vertically displaceable along guides. Preferably, the guides are fixed to the machine upright on either side of the machine table. This also leads to an increase in the overall stability of the spark eroder, and the workpiece and tool electrode can rapidly be made freely accessible.

In a further development of the machine according to the present invention, the fixed rear wall of the fixed component can be provided with outlets for flue gas suction and for the discharge of dielectric fluid at appropriate points, preferably in the center top and bottom thereof. These openings can be connected to corresponding pipes in the machine upright bed, which is not possible in conventional spark eroders.

According to a further preferred construction of the present invention, the wall element of the fixed component serving as the rear wall of the working container is designed as a housing for receiving all the supply and disposal means necessary for the operation of the working container (washing or scavenging location, type and quantity, temperature, level, filling, emptying, etc). Thermal stresses and consequently working inaccuracies can be avoided, or at least greatly reduced if the housing is spatially separated from the front wall of the machine upright. The fact that the machine table plate overhangs the free surfaces of the machine table reduces the contamination risk on the centering and clamping elements in the reference plane of the machine table by deposited, eroded material. This makes it possible to use top quality, highly accurate components, such as hydromechanical holding clamps, collets or the like.

The invention also makes it possible to build the machine upright and machine stand from a common casing frame of polymer concrete, whose cavities are filled for stabilization purposes with cores of a light filler, e.g., polystyrene or polyurethane. This measure significantly contributes to increasing stability of the machine.

Embodiments of the invention are described in greater detail hereinafter in relation to the drawings, which show:

FIG. 1: A perspective view of a spark erosion machine incorporating a first embodiment of the present invention, partly broken down into functional groups.

FIGS. 2a and 2b: Embodiments of the assemblies required for forming a working container.

FIG. 3: Assemblies of a further embodiment in front and side view, the movable component of the working container further being shown in the engagement position with the fixed component and also completely lowered therefrom.

FIGS. 3a to 3d: Different fixing possibilities for a sealing profile between the fixed and movable components of the working container.

Figure 4:
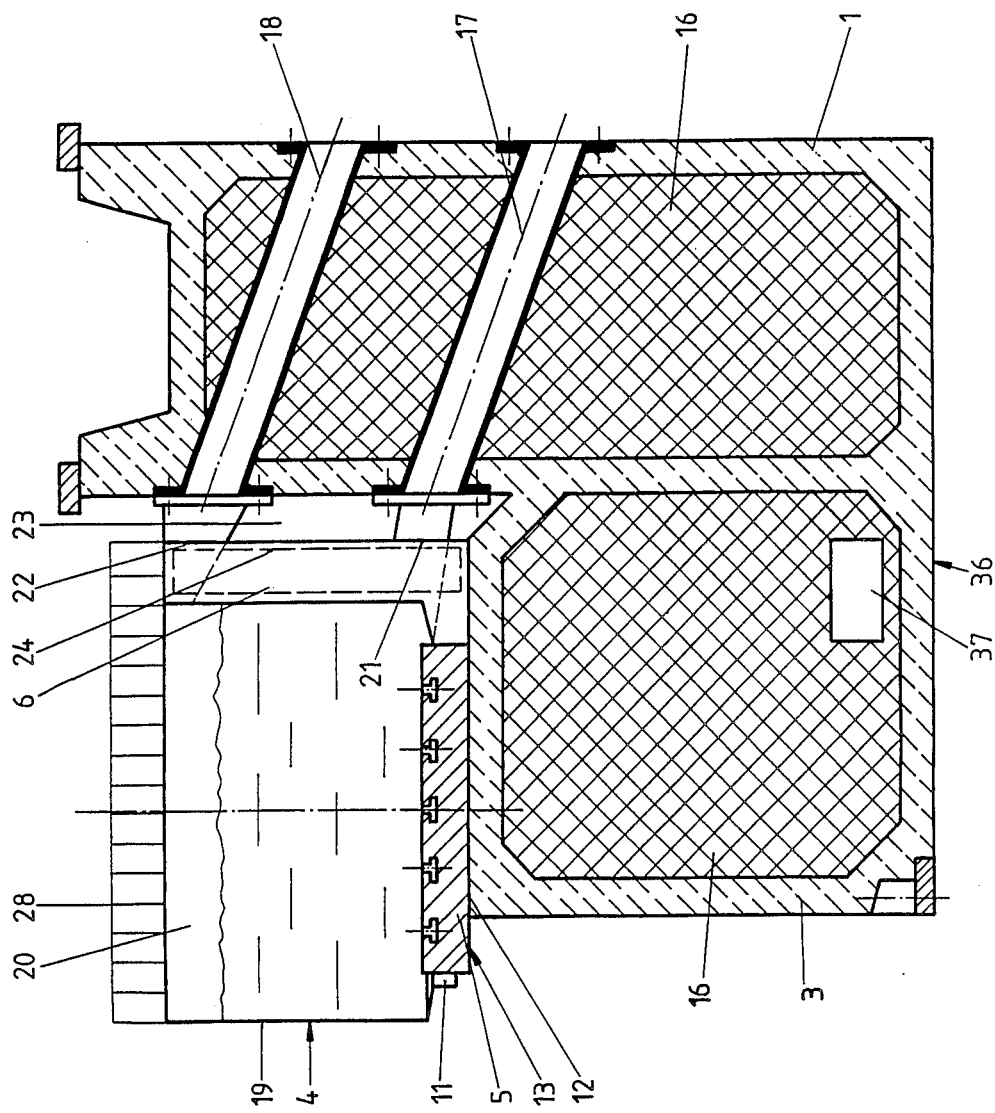

FIG. 4: A vertical section through the machine upright, machine table and working container of another embodiment having supply and disposal pipes for the working container located in the machine upright.

Figure 5:
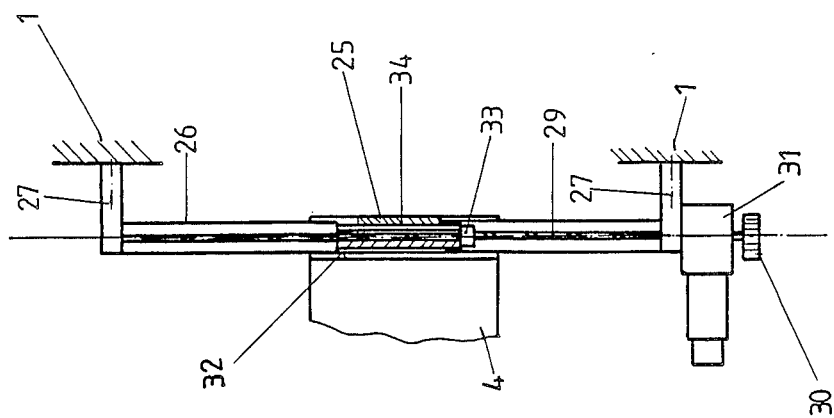

FIG. 5: An embodiment of a guide and a drive for the movable component of the working container.

The embodiments shown in the drawings include a machine upright 1, which carries an intermediate slide 7 that is longitudinally displaceable in a bed. This slide carries a transversely displaceable cross-beam 8, on the front of which is located the machine head 9 having an extendable and retractable spindle sleeve 10. A machine table 3 is constructed on the front of machine upright 1.

According to the embodiment shown in FIG. 4, the machine upright 1 and machine table 3 have a common polymer concrete casing frame 36, the cores 16 of which are filled with a lightweight filler such as polystyrene or polyurethane. This leads to a high degree of stability. Pipes 17, 18 are passed centrally through the machine upright 1 for the fluid discharge from the working container and for flue gas suction. These pipes additionally reinforce the machine upright 1 and give a better core holding action and favorable symmetrical thermal expansion.

A one-piece component 13, which is L-shaped in vertical section is fixed to the machine table 3 and preferably overhangs the machine table 3 at its free surfaces. Component 13 essentially comprises a horizontal machine table plate 5 and a rear, vertical wall element 6 directly adjacent to the machine upright 1. The machine table plate 5 serves as a substantial portion of the base and the vertical wall element 6 as a substantial portion of the rear wall of a working container for receiving the dielectric fluid. Machine table plate 5 is fixed with its lower surface in the reference plane 12 (FIGS. 3 and 4) by means of centering elements 14 and clamping elements 15 on the machine table 3. Between the machine upright 1 and the rear wall element 6 of the L-shaped, fixed component 13 there may be provided a space 23, an air cushion used for thermal insulation with respect to the machine upright 1.

The represented embodiments have an essentially parallelepipedic working container, which is assembled from the L-shaped, fixed component 13 and a complementary, movable component 4. The movable component 4 has an essentially C-shaped cross-section and includes a front wall 19 and two side walls 20 of the working container. The movable component 4 is vertically displaceable along guides 2. In the raised state the movable component 4 is in sealed engagement with the fixed component 13, so that the working container for the dielectric fluid is formed.

A statically operating seal 11, which is operable by a fluid, e.g. inflatable by air, or which can be an elastomer sealing profile, is used for sealing the interface region between the fixed and movable components. It is either fitted to a vertical flange 35 of the base and rear wall parts of the movable component 4 that are connected to the front and side walls 19, 20 (FIGS. 2b, 3a to 3d), or to corresponding lateral surfaces of the fixed component 13 (FIG. 2a) by bonding, clipping, pressing into profile holders, etc.

The portion of the fixed component 13 serving as the working container rear wall 6 may be constructed as a housing 24 for receiving all the supply and disposal means required for the operation of the working container. An outlet 22 for flue gas suction is preferably provided centrally through housing 24 near its top, while near the bottom there is an outlet 21 for the discharge or supply of the dielectric fluid. These outlets are fixed, e.g. flanged, to the aforementioned corresponding pipes 17, 18 in the bed of the machine upright 1.

The vertically movable component 4 carries along its top edge a contact safety shield 28, and the movable component 4 is held at the rear portion of the side walls 20 by bushes 25 sliding on vertical guides 2. Guides 2 are constructed as guide pipes 26 and are fixed to the front of the machine upright 1 in symmetrical relation to the machine table 3, such that the upper edge of the contact safety shield 28 is still below the upper edge of the machine table plate 5 with the movable component 4 in its lowered position. A spacing between the machine upright 1 and the guide pipes 26 is ensured by spacers 27. For moving the component 4, it is possible to use known drive systems for longitudinal movement, e.g. threaded spindles 29, continuous tensioning means (cable, chain, belt, etc), pneumatic or hydraulic lift cylinders, linear drives, etc.

The embodiment of FIG. 5 illustrates a combination guide and drive. The two guide pipes 26 are provided with elongated slots and in each case have a threaded spindle 29, which is drivable from the outside and rotatably mounted in the interior of the guide pipes. This spindle engages with a corresponding elevating nut 33, which is in turn positioned below a piston 34 slidably positioned in the interior of guide pipe 26 with a plastic sliding guide 32. Piston 34 can be connected through the elongated slot to the bushes 25 sliding along the outer walls of guide pipes 26. The bushes 25 support the movable component 4 of the working container for vertical movement. A gear brake motor 31 is associated on the base side with one threaded spindle 29. A toothed belt 30 running though an opening 37 on machine table 3 can be used for the synchronization of both threaded spindles 29.

Alternatively, the bushes 25 can be directly engaged with the threaded spindles 29 by an internal thread and can slide along the inner walls of guide pipes 26. In this embodiment, the bushes 25 are fixed to the movable component 4 by means of suitable connecting members, which project from the elongated slots of guide pipes 26. Thus, the bush 25 is additionally constructed as an elevating nut.

We claim:

1. A spark erosion machine comprising a machine upright; a fixed machine table disposed on a front side of the machine upright; a machine table plate attached to the machine table; a working container for containing dielectric fluid having a plurality of walls and a bottom and comprising a fixed component and at least one movable component, wherein the fixed component includes the machine table plate to form at least a portion of the bottom of the working container and a substantially vertical wall element attached to the machine table plate at a rear portion thereof to form at least a portion of that one of said walls of the working container which is disposed nearest to the machine upright.

2. A spark erosion machine according to claim 1, wherein the working container comprises a plurality of movable components adapted to be assembled together to form a one-piece movable component.

3. A spark erosion machine according to claim 1, wherein the movable component includes portions adjacent to the fixed component and forming a portion of the bottom of the working container and a portion of that one of said walls of the working container which is disposed nearest to the machine upright.

4. A spark erosion machine according to claim 1 wherein the wall element of the fixed component includes an outlet for flue gas suction and an outlet for draining dielectric fluid from the working container.

5. A spark erosion machine according to claim 1 wherein the wall element further includes a housing for supply and disposal equipment for the working container.

6. A spark erosion machine according to claim 1 wherein the wall element is spaced from the machine upright.

7. A spark erosion machine according to claim 1 wherein the machine upright and machine table are constructed from a common casing frame having its cavities filled with lightweight filler.

8. A spark erosion machine according to claim 1 wherein the movable component is adapted to be selectively vertically movable along at least one stationary guide.

9. A spark erosion machine according to claim 8 wherein two guides are provided, fixed to the machine upright in substantially symmetric relation to the machine table.

10. A spark erosion machine according to claim 8 wherein a controllable drive means is provided for effecting movement of the movable component of the working container along the at least one stationary guide.

11. A spark erosion machine according to claim 10 wherein at least one stationary guide comprises a pipe having a vertical slot formed therein and a threaded spindle rotatably mounted inside the pipe in axial relation thereto; the controllable drive means is operatively connected to the spindle for selectively rotating the spindle; and bush means are provided in association with the spindle for translating rotational movement of the spindle into vertical movement for transporting the movable component of the working container, the bush means being located within said pipe in threaded engagement with the spindle and in sliding engagement with the interior of the pipe and being operatively fixed to the movable component of the working container by a connecting member projecting through the vertical slot of the pipe.

12. A spark erosion machine according to claim 10 wherein at least one stationary guide comprises a pipe having a vertical slot formed therein, a threaded spindle rotatably mounted inside the pipe in axial relation thereto and a nonrotating elevating nut provided within the pipe in threaded engagement with the spindle; the controllable drive means is operatively connected to the spindle for selectively rotating the spindle; and a piston is disposed within the pipe in sliding engagement therewith and supported by the elevating nut, the piston being connected through the vertical slot by a connecting member to a bush adapted for sliding engagement with the exterior of the pipe and attached to the movable component of the working container.

13. A spark erosion machine according to claim 1, further including a means for sealing the interface formed between the fixed and movable components of the working container, the sealing means being provided on at least one of the fixed and movable components.

14. A spark erosion machine according to claim 13 wherein the sealing means comprises a profiled elastomer.

15. A spark erosion machine according to claim 13 wherein the sealing means comprises an inflatable hose.

16. A spark erosion machine comprising a machine upright having a front surface; a machine table attached to the front surface of the machine upright and having a substantially horizontal top surface; a machine table plate attached to the top surface of the machine table and including a substantially horizontal plate section plus an upwardly directed wall element connected to the plate section; and a working container for containing dielectric fluid during the operation of the spark erosion machine, comprising a substantially vertical circumferential wall and a bottom, said plate section being adapted to form at least a portion of the bottom of the working container and said upwardly directed wall element being adapted to form a portion of the wall of the working container which is disposed nearest to the machine upright during the operation of the spark erosion machine, said wall of the working container being separate from the machine upright.

17. A spark erosion machine including a machine upright and a working container means for containing dielectric fluid during the operation of the spark erosion machine, wherein the working container means includes a bottom and walls and comprises a fixed component and a movable component, the fixed component including a machine table plate operatively fixed to said machine upright and forming at least a portion of the bottom of the working container means plus an upwardly directed wall element connected to the machine table plate and forming a portion of the walls of the working container means which is disposed nearest to the machine upright, said portion of the walls of the working container means being separate from the machine upright, and the movable component forming the remainder of the walls of the working container means and being movable to a position away from the fixed component to allow access to the machine table plate.

* * * * *